United States Patent [19]
Hummel et al.

[11] 3,865,580
[45] Feb. 11, 1975

[54] COPPER RECOVERY PROCESS

[76] Inventors: Theodore W. Hummel, 187 Maplewood Ave., Rochester, N.Y. 14613; Paul C. Schroy, 336 Yarmouth, Rochester, N.Y. 14610

[22] Filed: Sept. 14, 1973

[21] Appl. No.: 397,386

Related U.S. Application Data

[63] Continuation of Ser. No. 210,435, Dec. 21, 1971, abandoned.

[52] U.S. Cl.......................... 423/32, 423/27, 299/5, 75/103, 75/117
[51] Int. Cl....... C01g 3/00, C01g 3/14, C22b 15/10
[58] Field of Search.......... 423/32, 23; 75/103, 117, 75/101 R, 101 BE; 433/27

[56] References Cited
UNITED STATES PATENTS

| | | | |
|---|---|---|---|
| 3,127,264 | 3/1964 | Tscheiner et al. | 75/117 X |
| 3,201,334 | 8/1965 | Ben-Bassat et al. | 75/117 X |
| 3,438,811 | 4/1969 | Harriman et al. | 75/117 X |
| 3,511,645 | 5/1970 | Goni | 75/117 X |
| 3,634,070 | 1/1972 | Lendstrom et al. | 75/117 X |

*Primary Examiner*—Herbert T. Carter
*Attorney, Agent, or Firm*—Thomas B. Graham

[57] ABSTRACT

Copper is recovered from native sources, and scrap sources, by accelerated solution thereof into ammonia plus ammonium carbonate solution with a catalyst which oxidizes copper from copper metal to the cuprous and from the cuprous to the cupric state, the catalyst being chelated iron, which is returned to its effective ferric catalytic state, and maintained in solution as a chelate by the oxidation of the medium in which the solution takes place. Following solution of the copper, recovery can occur in virtually any conventional manner.

11 Claims, 1 Drawing Figure

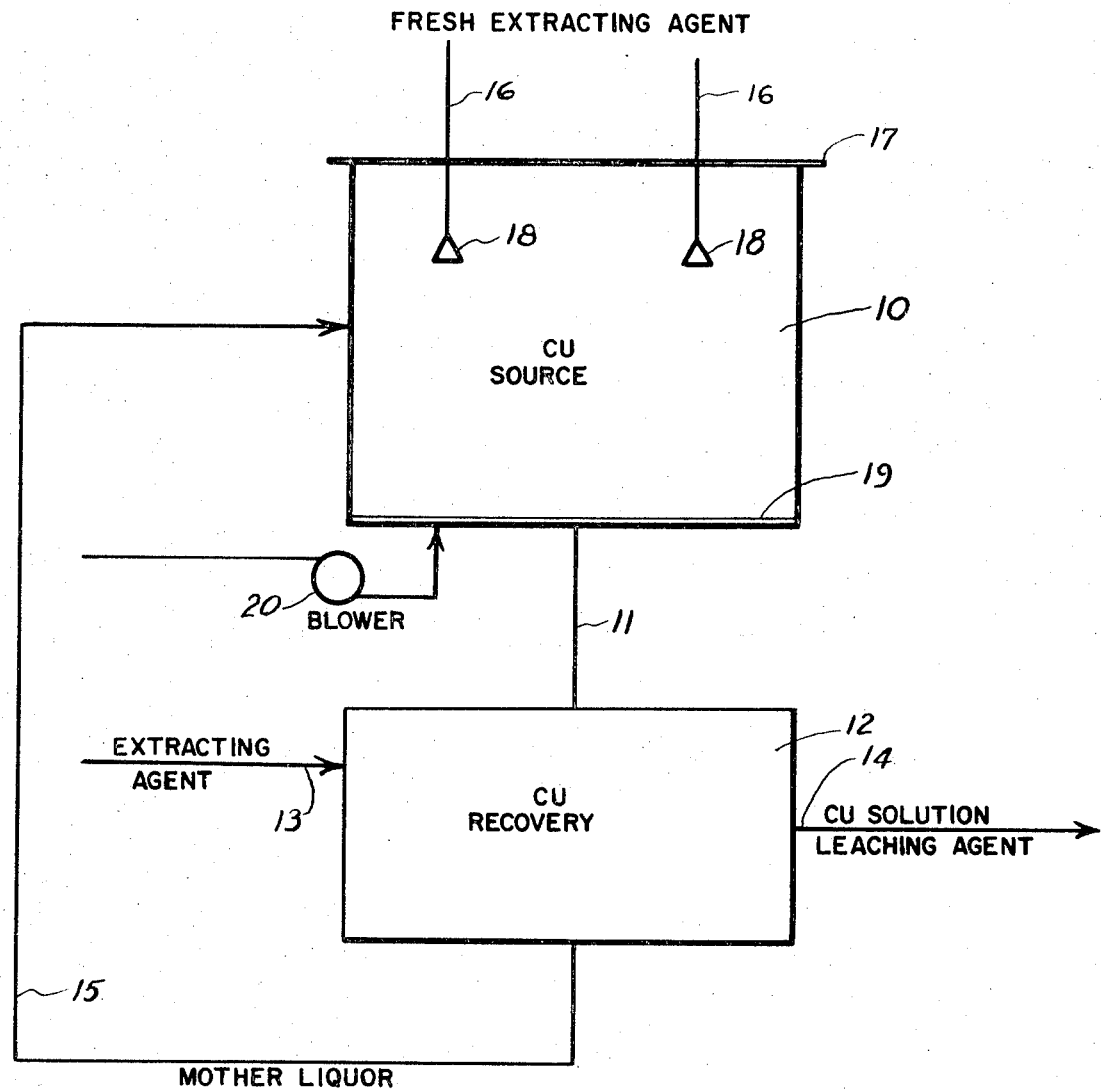

COPPER RECOVERY PROCESS

RELATED APPLICATIONS

This application is a continutaion of our copending application Ser. No. 210,435, filed Dec. 21, 1971 now abandoned.

BACKGROUND OF THE INVENTION

Native copper, that is, copper in the metallic state occurs commonly in some areas wherein the copper, as a metal, is dispersed in rock. It is desirable in these circumstances to have a means for bringing the copper into solution for purification. Because many of the areas where metallic copper occurs, for example, copper mines in the neighborhood of Lake Superior contain copper dispersed in rock which has a high calcite content, it appears that a selective extraction can be had using ammonia plus ammonium carbonate with oxidation.

This reaction of copper with ammonium carbonate and ammonia in the presence of oxygen or air can be outlined as follows:

1. $Cu° + Cu^{++} (NH_3)_4 CO_3 \xrightarrow{\text{(reduction)}} Cu_2^+ (NH_3)_4 CO_3$
2. 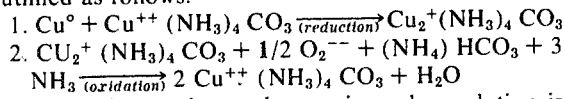

The cupric ammine carbonate in such a solution is looked upon as the oxidizer for copper in the zero valence state, that is, metallic copper. The direct reaction of ammonium carbonate solution with metallic copper in the absence of oxygen or cupric ion is so slow as to be unproductive and impractical for the purpose. For example, it may take as many as several days to dissolve a few grams of copper in a liter of ammonium carbonate solution under ordinary static conditions. Hence, the possibility of extracting the metallic copper from accompanying ore such as calcite is not a promising means without some significant acceleration of the rate of dissolution of copper in ammonium carbonate solution.

It is, accordingly, the basic object of this invention to provide a process for the extraction of copper from accompanying materials, such as carbonate rock, by means of an aqueous ammonia-carbonate solution, wherein the copper is relatively rapidly brought into solution as a complex amine, from which condition it can be conveniently recovered.

It is another object of the invention to provide a catalytic composition useful in a process for the aqueous extraction of copper from ores using the carbonate solution, the catalyst composition being a catalytic metal maintained in soluble form by means of a chelating composition for holding the catalytic metal in the ammoniated alkaline solution under the oxidizing extracting conditions.

Other objects and advantages of the invention will in part be obvious and in part appear hereinafter.

DETAILED DESCRIPTION OF THE INVENTION

The invention, accordingly, is in a process for extracting native copper from accompanying rock, or for extracting copper from scrap, or for the recovery of copper metal from admixture with other metal or alloys, as a preliminary to a further copper refining process, the operation being characterized by the use of the basic reaction of forming the complex copper ammine in an ammonia-ammonium carbonate aqueous medium, oxidizing the copper from the zero valence native state to the plus 1 and plus 2 valence, characteristic of soluble copper, by means of oxygen and a catalytic redox system in the form of a chelated iron in the ferric form, the iron being chelated in a mixture of (a) an amino acid chelating agent containing only acetic acid groups in its structure, (b) an amino acid chelating agent containing one ethanol group with other acetic acid groups in its structure and (c) a polyhydroxycarboxylic acid with a 3 – 7 straight chain carbon structure.

The process thus used to dissolve native copper, or copper metal from ore, or scrap, is to percolate or leach the source of copper with an appreciable amount of ammonium carbonate solution, containing an appreciable amount of ammonium hydroxide, in the presence of air or oxygen, assisted by copper in the form of cupric amine carbonate solution, to oxidize the copper metal to cuprous amine carbonate, which is then oxidized by air to the cupric amine, which can be reused as an oxidizer for the copper metal.

Addition of copper amine solution per se might not be economical if solubilizing and leaching were to be carried out in mine pits or on a large scale because of the absorption of the solution containing the copper by porous rock.

In our process we have discovered a special ferric iron chelate composition, or ferrous chelate that is readily oxidized to ferric, added to the ammoniacal ammonium-carbonate solution oxidizes the copper metal from the native or metallic state at a significant or accelerated rate, to permit solution to a much higher copper concentration and in a shorter time, in the aqueous medium than is otherwise attainable. This shows visibly and immediately in the intense blue color which is obtained in the aqueous solution in our process as compared with that obtained with ammonium carbonate solution not employing the special chelated iron.

It appears the mechanism of the reaction in our process may be that in the oxidation of copper the ferric chelate is reduced to soluble ferrous chelate and kept in solution with the chelating agents, thereby preventing the blinding or "plugging" of the copper metal surface. Also due to the chelating action of the chelating agent, this solubilizing action permits the ferrous chelate to oxidize rapidly through contact with the oxygen in air to the ferric chelate to serve as the oxidizing agent for redissolving additional copper metal.

Also ferric (+3) metallic chelate is less stable under $NH_3$ conditions at pH above 7.0 than Cupric (+2) chelate; which seems to improve solubility of Cu° (metal 0) under the pH in $NH_3$ solution for forming the coordinate complex.

The iron chelate of the chelating agents is made by simple reaction of an iron compound with an alkali metal salt of the mixed chelated compounds in water solution. Freshly prepared ferric hydroxide is useful for preparation of the pure chelates.

Generally, it is not important that the ferric chelate be pure, hence, ferrous sulfate can be used to make the chelate.

The iron chelate is made by reacting a ferric or a ferrous salt with the chelating composition which is described in detail in the following. The purpose is to have the chelating composition carry about one mole of iron per mole of chelating composition, and in view of the fact that it is a mixed material, the weight ratio is determined on the ratio of components in the chelating agent mixture.

The chelating agent useful for the process is a combination of ingredients, specifically, (a) an alkali metal salt of an aliphatic polyhydroxy monocarboxylic acid, (b) an alkali metal salt of a hydroxyalkyl-amine polycarboxylic acid and, (c) a separate amine polycarboxylate alkali metal salt, derived from nitrilotriacetic acid, ethylene diamine tetraacetic acid, or diethylene triamine pentaacetic acid. Actually, the chelate forming ingredients used to make the iron chelate used in our process are some of those of the alkaline chelating compositions described in Military Specification MIL-C 14460B (14460A) dated 18, July 1960, United States Government Publication.

It is made up in weight proportions to a total of 100 parts of:

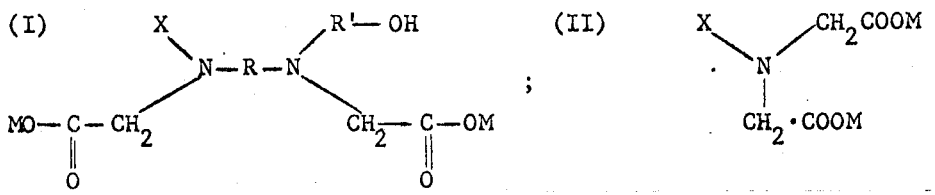

From about 50 to about 90 parts of (a) an alkali metal salt of an aliphatic polyhydroxy monocarboxylic acid. Any metal seems to be useful in this capacity, although for purposes of uniformity in relationship to the entire chelating metal control composition, it will be convenient for the metal to confer upon the salt solubility properties consistent with the solubility properties of the remaining ingredients. Thus, where an aqueous medium is to be encountered in the utilization of these materials, it will be found convenient to employ as the salt-forming ion an alkali metal, ammonia, or a substituted ammonia, for example, alkyl amines having the formula $R-NH_2$ or $R_2NH$ wherein R is an alkyl group containing from 1 to 3 carbon atoms. The alkali metals are well known and include sodium, potassium, lithium, cesium and rubidium. Ammonia, of course, confers water-solubility on the end product, particularly because of the presence of more than one hydroxy group in the molecule. The salts which tend to be less water-soluble include the alkaline earth metal salts such as calcium, barium, strontium, and magnesium, iron, cobalt, nickel, zinc, chromium, cadmium, manganese, zirconium, titanium, etc.

The aliphatic polyhydroxy monocarboxylates are conveniently derived from naturally occurring sugars and gums, such as, for example, by treatment of a sugar with HCN to form the nitrile followed by hydrolysis to form the monocarboxylic acid. These compounds are characterized by the presence therein of from 3 to 10 or more carbon atoms, at least two hydroxyl groups and most frequently one hydroxyl group attached to each carbon atom including the carboxyl carbon atom, and certain instances such as in the case of material derived from fructose, a carbonyl group intermediate the ends of the aliphatic chain. For most purposes these acids contain 5 or 6 carbon atoms and an equal number of hydroxyl groups including a hydroxyl group forming a part of the carboxyl group. The most notable examples of these materials include sodium gluconate, sodium glucoheptanate, potassium gluconate, ammonium gluconate, calcium gluconate, barium gluconate, zinc gluconate, sodium mannonate, potassium monnonate, sodium glycerate, potassium gluconate, the sodium, potassium, ammonium, and lithium salts of acids derived from natural gums such as Guar gum, locust bean gum, gum arabic, gum tragacanth, etc. For most purposes, the alkali metal gluconates, and glucoheptanates, the ammonium gluconates and glucoheptanates, and the amine gluconates and glucoheptanates will be found suitable for use in the compositions intended for aqueous utilization in the process of this invention, and the calcium, barium, magnesium gluconates and glucoheptanates will be found suitable for use in those procedures involving non-aqueous media. (b) The second principal component of the chelating metal control compositions useful in the present invention is, as indicated above, from about 5 to about 25 parts of a hydroxy-alkyl amine polycarboxylate having the general formulae: I and II wherein R is an alkylene group containing from 2 to 4 carbon atoms, R' is an alkylene group containing from 1 to 5 carbon atoms, X is a radical selected from the group consisting of $-R'-OH$ and $-CH_2-COOM$, and M is selected from the group consisting of sodium, potassium, lithium, ammonium, hydrogen, substituted ammonium, and hydrazide moieties produced by reaction of hydrazine with the acid to give a $-CH_2CONHNH_2$ and $NHR$ structure. A particularly suitable example for use as the second component of the chelating metal control composition of this invention is the sodium salt of hydroxy ethyl ethylenediamine tri-acetic acid. Also of particular utility in accordance herewith is the di-hydroxy ethyl ethylene-diamine diacetate of sodium; also hydroxyethyl diglycine and diethenolglycine. As indicated above, the central alkylene group, R, may be ethylene, propylene, isopropylene, butylene, isobutylene, amlyene, isoamylene, etc. The longer the alkylene groups in these compositions the greater solubility in non-aqueous media, such as mineral spirits. The alkaline earth metal salts, such as, the barium salts of hydroxy-ethyl ethylene diamine triacetic acid may conveniently be used in the chelating metal control composition particularly adapted for non-aqueous emulsion polymerization media. Other salts suitable for use as component (b) of the present chelating metal control compositions include the sodium salts of hydroxy propyl, propylene diamine tri-acetic acid, the potassium salt of hydroxy butyl butylene diamine triacetic acid, the sodium salt of di-(hydroxy ethyl) propylene diamine di-acetic acid, the calcium salt of hydroxy ethyl ethylene diamine triacetic acid, the ammonium salt of hydroxy ethyl ethylene diamine tri-acetic acid, the ethylamine salt of hydroxy ethyl ethylene diamine tri-acetic acid, and similar compounds as will occur to those skilled in the art. (c) The third principal ingredient of the chelating metal control compositions of the present invention is, as indicated above, from about 5 to 25 parts of a metal salt of a polyamine polycarboxylate in which all of the amino hydrogens have been replaced by carboxyl-containing aliphatic radicals, particularly the methylene carboxyl radical. Specific examples of component (c) of the chelating composition useful in the invention include, therefore the sodium, potassium, lithium, cesium and rubidium metal salts, and ammonium and substituted ammonium salts and hydrazine moieties produced by reaction of hydrazine with the acid to give a —CH$_2$CONHNH$_2$ and NHR structure of ethylene diamine tetraacetic acid, diethylenetriamine pentaacetic acid, nitrilotriacetic acid.

The chelating control compositions are conveniently employed as dry powders, although they may also, if desired, be employed in the form of aqueous solutions or pastes or as organic dispersions or solutions. The nature of the metal ions employed in neutralizing the acidic components will determine to a large extent the solvent system into which these materials are dissolved or dispersed.

In formulating the chelating agents of the present invention, the relative proportions of compounds (a), (b), and (c) as above described are as follows:

| Weight Percentage | Chelate Blend No. 1 |
|---|---|
| 52 | Sodium gluconate |
| 13 | Trisodium salt of N-hydroxyethyl ethylene diamine tri-acetic acid |
| 35 | Ethylenediamine tetra-acetic acid tetrasodium salt dihydrate |

| | Chelate Blend No. 2 |
|---|---|
| 50 | Sodium gluconate |
| 26 | Trisodium salt of N-hydroxyethyl ethylene diamine tri-acetic acid |
| 24 | Ethylene diamine tetra-acetic acid, sodium salt |

| | Chelate Blend No. 3 |
|---|---|
| 50 | Sodium gluconate |
| 25 | Nitrilo-triacetic acid, sodium salt |
| 25 | Ethanol diglycine, sodium salt |

| | Chelate Blend No. 4 |
|---|---|
| 80 | Sodium gluconate |
| 10 | Ethylenediamine tetra-acetic acid, sodium salt |
| 10 | Di-hydroxyethyl glycine, sodium salt |

| | Chelate Blend No. 5 |
|---|---|
| 80 | Sodium glucoheptonate |
| 10 | Ethylenediamine tetra-acetic acid, sodium salt |
| 10 | Trisodium salt of N-hydroxyethylethylenediamine tri-acetic acid |

| | Chelate Blend No. 6 |
|---|---|
| 80 | Sodium salt of glucoheptonic acid |
| 10 | Ethylenediamine tetra-acetic acid, sodium salt |
| 10 | Ethanol diglycine, sodium salt |

| | Chelate Blend No. 7 |
|---|---|
| 75 | Gluconic acid ammonium salt |
| 15 | Ethylenediamine tetra-acetic acid ammonium salt |
| 10 | Ethanol diglycine, ammonium salt |

| | Chelate Blend No. 8 |
|---|---|
| 5 | Potassium salt of glucoheptonic acid |
| 5 | Ethylenediamine tetra-acetic acid, potassium salt |
| 90 | Ethanol ethylenediamine tri-acetic acid, potassium salt |

| | Chelate Blend No. 9 |
|---|---|
| 75 | Lithium gluconate |
| 12.5 | Hydroxyethyl diglycine lithium salt |
| 12.5 | Ethylenediamine tetra-acetic acid, lithium salt |

| | Chelate Blend No. 10 |
|---|---|
| 50 | Sodium glucoheptonate |
| 12.5 | Trisodium salt of N-ethanolethylenediamine tri-acetic acid |
| 12.5 | Trisodium salt of nitrilo triacetic acid |
| 25 | Disodium salt of ethanol diglycine |

| | Chelate Blend No. 11 |
|---|---|
| 40 | Sodium gluconate |
| 40 | Sodium glucoheptonate |
| 10 | Ethylenediamine tetra-acetic acid, sodium salt |
| 10 | Trisodium salt of N-hydroxyethyl ethylene diamine tri-acetic acid |

| | Chelate Blend No. 12 |
|---|---|
| 75 | Sodium glucoheptonate |
| 10 | Nitrilo triacetic acid, sodium salt |
| 12.5 | Diethanol glycine, sodium salt |
| 12.5 | Ethanol diglycine, sodium salt |

| | Chelate Blend No. 13 |
|---|---|
| 75 | Sodium glucoheptonate |
| 15 | Sodium salt of N-propanol ethylenediamine tri-acetic acid |
| 10 | Sodium salt of nitrilo triacetic acid |

| | Chelate Blend No. 14 |
|---|---|
| 10 | Sodium salt of ethylenediamine tetra-acetic acid |
| 40 | Aluminum salt of gluconic acid |
| 50 | Aluminum salt of ethanol diglycine |

| | Chelate Blend No. 15 |
|---|---|
| 5 | Sodium salt of nitrilo triacetic acid |
| 45 | Diethanol glycine, sodium salt |
| 50 | Sodium glucoheptonate |

| | Chelate Blend No. 16 |
|---|---|
| 75 | Sodium glucoheptonate |
| 10 | Trisodium salt of ethanolethylenediamine tri-acetic acid |
| 15 | Hydroxy-ethyl diglycine, sodium salt |

The chelate blends number 1 and 2 are mutually coordinated mixtures of formulations given in Military Specification MIL-C-14460 A and 14460B of 18 July 1960 for alkaline chelating of iron.

As indicated previously, the three ingredients of the chelating composition are operable over a wide range. For the copper extraction process, it will, or course, be possible to determine the preferred percentages of the respective ingredients in accordance with the particular extraction problem at hand, i.e., the nature of the ore or the scrap from which copper is to be extracted.

The purpose of the different types of chelating agents in the compositions is to maintain both the ferric and the ferrous iron in chelate form in solution in the high pH range of ammonium carbonate-ammonium hydroxide solution thereby to permit (1) oxidization of ferrous chelate to ferric chelate and (2) the ferric chelate oxidizing and solubilizing the copper metal in the ammonium carbonate solution and (3) the reoxidizing the ferrous to the ferric chelate with air or oxygen. Any precipitation of the iron, especially in the ferrous state, would stop the reaction as well as blind or "plug" the copper metal surface thereby retarding the rate of copper solution.

As indicated, we have discovered that the mixture of the chelating agents containing between 5 and 25% of the (c) type, such as ethylenediaminetetraacetic acid sodium salt, between 5 and 25% of (b) type, such as the hydroxyethylenediaminetriacetic acid sodium salt is effective for use in copper extraction when used as an iron chelate in the ammonium carbonate solution. To make the iron chelate 40% aqueous solution of these chelating agents is reacted with ferrous sulfate heptahydrate, or preferably ferrous hydroxide to give a pure chelate, in 1:1 weight ratio. When dried it gives the acid iron chelate (AIC) used in the solution and useful in the process.

The mixture of chelating agents, by the catalytic material which has the iron in ferrous or ferric chelate form to accelerate the solubilization of copper from the metal, whether the metal be that which occurs naturally in earth or scrap metal, is composed thus of the three ingredients, a, b, and c.

FIG. 1 diagrams a flow sheet illustrating the application of the process.

DETAILED DESCRIPTION OF THE INVENTION

Tests demonstrated the improvement in the rate of solution of metallic copper which can be had by utilizing an ammonium carbonate + ammonia or an ammonia + carbon dioxide water solution, as a medium in which to dissolve copper utilizing the redox system of iron chelated with the composition described.

We refer to it as an "ammonia-carbonate" solution because it is a known fact of chemistry that ammonium carbonate is not a precisely defined or definable compound and that the true nature of an ammonium carbonate solution is an equilibrium between ammonium carbonate and carbamate as follows:

$$NH_4HCO_3 \rightleftharpoons NH_2CO_2NH_4$$

which equilibrium can actually be looked upon as a precursor equilibrium to the formation of urea. That is, it is possible to consider the ammonium carbonate solution as an ultimate equilibrium of ammonium and carbonate ions, and further, some equilibrium with urea. This very complex form of ammonia in solution creates a reactive medium, with these various active forms of ammonia and ammonium ion in reactive form, for combination with copper to form the complex cupric ammine carbonate, which is the form in which copper goes into solution. Necessarily, such an ammonia-carbonate-carbamate-ammine solution is strongly alkaline and any redox system therein, particularly one involving iron, to be active in solution, must remain in solution. It is here that the efficacy of our chelating mixture in holding the iron in solution shows in its ability to accelerate the solution of copper.

PREPARATION OF THE ACID IRON CHELATE

The iron chelate (which we sometimes abbreviate to A.I.C.) is the term we use to describe the composition made by forming an iron chelate of the chelating composition of (a), (b), and (c) described herein. The typical chelating composition for iron chelate as we use it in the extraction process, is a 1:1 by weight chelate formed with the combination chelating agent of any one of the formulas and an iron salt. To make a pure form of iron chelate, ferric hydroxide can be freshly prepared and reacted with the chelating composition to form the iron chelate. Actually, we use ferrous sulfate, heptahydrate, ($FeSO_4 \cdot 7H_2O$) because the presence of a certain amount of sulfate ion in the copper solution is not detrimental. Thus, the iron chelate is prepared by dissolving dry $FeSO_4 \cdot 7H_2O$ in a 40% aqueous solution of mixed chelates consisting of 80 parts of the sodium heptagluconate, 10 parts of the sodium salt of ethylenediaminetetraacetic acid, and 10 parts of the sodium salt of hydroxyethyl ethylenediaminetriacetic acid. This solution can be used as such, or it can be tray dried, spray dried, to form an acid iron chelate (AIC) powder for use in the process.

In view of the fact that the process of extracting native copper from its ores depends upon the use of the classic aqueous ammonium-carbonate-carbamate equilibrium to dissolve copper to form a complex cupric amine and the acceleration of that reaction by the use of our iron chelate in the redox system, it is important to observe that the ammonium carbonate, or carbamate, aqueous solution has its concentration generally in the order of 10–30% solids plus ammonia to give a ratio of between 2:1 and 4:1 of $NH_3$ to $CO_2$ in the solution. To this is added the chelating composition with iron chelate which functions to complete the redox system for accelerating the formation of solution of copper.

Tests conducted on a small scale demonstrated:

1. the iron chelate of ferric iron, in ammonium-carbonate solution oxidizes copper metal with production of ferrous chelate;

2. ferrous chelate in ammonium carbonate solution is oxidized with oxygen (air) to form the ferric chelate as shown by its red color in aqueous solution;

3 the ferric chelate in the ammonium-carbonate solution accelerates the solution of copper metal to form copper ammonium-carbonate (blue) solution, at a rate substantially above that at which it forms in ammonium-carbonate solution alone.

For purposes of experimentally demonstrating the points noted, ammonium-carbonate solution was prepared as follows:

Solution: A — Ammonium Carbonate $(NH_4)_2CO_3$

10% solution — Dissolve 50 grams $(NH_4)_2CO_3$ solid in 450 grams water (warm). To solution add 50 milliliters 28% $NH_4OH$, reagent grade. Keep solution cool to prevent excessive loss of $NH_3$ vapor. At this concentration the pH = 8.5 to 8.9 by colorimetric determination.

Solution: B — Iron Chelate

Dissolve 0.2 gram acid iron chelate (AIC) in 20 milliliters of $(NH_4)_2CO_3$ solution. The solution is a clear greenish color (ferrous chelate).

Note: Iron chelate is $FeSO_4 \cdot 7H_2O$ solid in 40% aqueous solution, 80 parts heptagluconate, 10 parts ethylenediaminetetraacetic acid, 10 parts hydroxyethyl ethylenediaminetriacetic acid all sodium salts, the mixture being dried to a solid product.

The efficacy of the ammonium carbonate solution as such and the ammonium carbonate solution with the iron chelate additive was evaluated by forming a first solution as a control. Experimentally on a small scale the first solution (solution A) was used to wet a sample of copper metal, wire cuttings, sufficient solution being used to wet and submerge the cuttings. In a test tube quantity this need be only about 5 milliliters. With the copper submerged and the solution agitated in air for several minutes at intervals of 10 minutes, it showed a development, at first, of a red, characteristic ferric chelate color, which became brownish and ultimately, after 10–15 minutes with the aeration, substantial bluish green. This showed that copper had commenced to pass into the solution in quantity. With standing for a period of about 6 hours the solution becomes a dark greenish blue.

Comparison of the control solution without the iron chelate addition showed that after some 6 hours with shaking, etc., only a very light blue color developed indicating a trace of copper was passing into the solution.

In a further small scale test of evaluation of the acceleration of copper solution a 2 per cent solution was made of the iron chelate used in increments in 50 milliliters of 10% ammonium carbonate solution with ammonia to pH 8.5.

To 12½ milliliters of this 10% ammonium carbonate solution, in which copper was standing, was added 20 drops of the 2% iron chelate solution (½ milliliters).

In a second test, using 12½ milliliters of ammonium carbonate solution and copper 40 drops of the 2% iron chelate was added (1 milliliter).

On agitation with air, it was found that second solution with the larger amount of the iron chelate reacted with the copper faster, as shown by the rapid blue-green color development, than the first solution which, while developing a blue color, was somewhat less than half as intense. After 6 hours standing and additional shaking in air to oxidize the solutions, both solutions were dark showing substantial solution of copper, but the one carrying the higher concentration of iron chelate had the higher concentration of copper.

In a process such as we have devised wherein the metallic copper is brought into solution and there is no need to balance the exact amount of copper against the amount of solution being used, the important variable is the matter of aeration and developing adequate concentration of copper in the ammonium carbonate by any mechanical manipulation of the resulting solution with respect to the copper metal.

A sequence of tests was carried out to devise and observe the minimum level of oxidation which might be useful and it was found, on the basis of the small scale tests, that wetting of the copper surface with ammonium carbonate solution containing the iron chelate substantially accelerated solution of copper as compared with the plain ammonium carbonate solution. That is, the tests were carried out merely by half submerging copper in aqueous ammonium carbonate and aqueous ammonium carbonate containing the iron chelate and comparing the rates of solution. The mere mechanical, occasional, wetting of the copper surface induces enough oxidation at the surface thus wetted to bring copper into solution at a useful rate. Concentrations approaching 50 and 150 grams per liter in 20% ammonium carbonate solution carrying about 1–5% of the iron chelate of any one of the formulas given, is suitable.

The application of this technique to copper ore extraction in a wet method on a practicable and useful scale at a mine site or refining site can be observed from the following example:

I - Example of Cu Ore Extraction 6,000 pounds of calcite ore bearing 3 to 4% native copper is piled in a concrete vat provided with concrete sides and a bottom drain, connected to a pump with piping and a series of spray heads located over the ore pile as described in connection with FIG. 1. A cover (wooden or polyethylene, plastic, film) is loosely laid over the whole pile to confine the sprays, but still allow air to reach the ore pile. A solution of 196 pounds of solid ammonium carbonate, 366 pounds of 29% $NH_3$ solution, and 438 pounds water is prepared in a separate tank, with agitation, at about 70°F. To this ammonia-carbon dioxide solution is added 2.2 pounds of dry powdered iron chelate, which readily dissolves. This iron chelate modified solution is then pumped to the sprays to wet the ore pile for one minute, then shut off for 4 minutes; then sprayed for 1 minute and repeated in this manner. By use of an electrically timed relay, 1 minute spray, 4 minutes off, the intermittent wetting can be carried out as long as needed. The oxygen from the air will oxidize the $Fe^{++}$ to $Fe^{+++}$ in the wetting solution covering the ore, which in turn will start oxidation of the $Cu°$ metal to $Cu^+$ (ous) ammonium carbonate. This in turn will, in the presence of the oxygen in the air, be oxidized to the blue colored $Cu^{++}$ (ic) ammonium carbonate solution. The $Fe^{+++}$ chelate being reduced by $Cu°$ metal to $Fe^{++}$ (ons) will at the same time be oxidized to $Fe^{+++}$ (ic) chelate; and both the $Fe^{+++}$ and $Cu^{++}$ will then oxidize further $Cu°$ metal, bringing it into solution. After 24 hours of this intermittent spraying and recycling the run-off solution to the tank supplying the spray will be dark greenish blue and contain up to 120 grams copper per liter of solution, or about 120 pounds of copper in the ammoniacal solution, from which the copper can be recovered by solvent extraction. The solution can then be recycled to the spray system for further solution of the Cu metal in the ore. Solvent extraction can consist of 10 volume percent of LIX 64 (General Mills Chemical, Inc.) at pH 8–10 will pick up 4.4 to 4.8 grams per liter of copper from the water solution. The LIX petroleum solvent solution can then be recovered in a separate system by extraction with sulphuric acid solution returning the hydrocarbon solution with LIX back to the original solvent extraction system. The solution from this acid extraction of the solvent can then be electrolyzed or the copper recovered by any of the currently known methods.

The ammoniacal solution can be made by bubbling carbon dioxide into $NH_3$ solution in water to the required concentrations.

In specific application to large scale copper recovery in essentially quantitative terms for an industrial scale operation where scrap copper is recovered, the following example is useful.

II - Example of Cu metal scrap recovery

From 200 to 500 pounds of scrap copper is charged into a suitable tank (concrete or iron) provided with bottom drains to storage tank and circulating pump. The tank has a plate with holes ⅛ to ¼ inch in diameter spaced over the entire area so that the extracting iron chelate ammonium carbonate solution is distributed and can drip down over the Cu bearing scrap to keep it moist. An air inlet is provided near the bottom of the tank to permit entry of air from a small blower without loss of the extracting liquid. A mixture of 75 pounds dry ammonium carbonate, 137 pounds 29% $NH_3$ solution, and 788 pounds water is made at 70°F. with agitation. To the solution 22 pounds of the dry iron chelate powder is added forming a greenish colored solution. This solution is then pumped onto the distribution plate at the top of the tank and the solution percolated down onto the scrap Cu metal, with a gentle movement of air up through the plate holes. The addition can be timed intermittently as in Example I, or it can be controlled with a float cut-off valve mounted in such a way that the flow to the plate is cut off when the solution level is at a certain height, about 1 to 2 inches. The ammoniacal iron chelate solution will oxidize the Cu metal dissolving to a blue solution in the presence of the air as described in Example I. At the same time any zinc in the copper scrap metal will also be dissolved in the ammoniacal solution. After 24 hours of percolation the ammoniacal solution will be dark blue and contain in the neighborhood of 75 grams of Cu per liter or 75 pounds of copper in solution, provided the scrap metal has over this amount of copper available before being extracted.

The $NH_3$ to $CO_2$ ratio in the ammonium carbonate solution can vary from 3:1 to 4:1 and the $(NH_4)_2CO_3$ concentration can vary from 2.8 gram moles $CO_2$ to 0.5 gram mole $CO_2$ per liter. Iron chelate corresponding to any of the formulas given is useful.

Preparation of iron chelates used in extraction of metallic copper with ammoniacal carbonate solutions is as follows: Take 100 pounds of ferrous sulfate heptahydrate and 100 pounds of any of the mixed chelating agent formulas. Make a 40% solution of the chelating agents. After mixing in the ferrous sulfate to form a liquid mixture, the liquid is dried by any standard means such as a heated roll drier, a spray type hot air drier, or a freeze type vacuum drier. The dry powder product may be ground fine or screened to remove any large particles and is easily dissolved in water or ammonium-carbon dioxide water solutions.

Typical Chelating Agent

| Mixtures | 50 parts 40% Na glucoheptonate |
| | 25 parts 40% Na EDTA (or NTA) |
| | 25 parts 40% Na HEEDTA (or EDG) |
| | |
| | 70 parts 40% Na gluconate |
| | 15 parts 40% Na NTA (or EDTA) |
| | 15 parts 40% Na HEEDTA (or EDG) |
| | |
| | 60 parts 40% Na gluconate |
| | 20 parts 40% Na NTA (or EDTA) |
| | 20 parts 40% Na HEEDTA (or EDG) |
| | |
| | 80 parts 40% Na glucoheptonate |
| | 10 parts 40% Na EDTA (or NTA) |
| | 10 parts 40% Na HEEDTA (or EDG) |

That is, it should be apparent the precise composition of the iron chelate is variable through any of the formulas of mixed chelating agents indicated and through any of the formulations given above. That is, it consists of gluconate and polycarboxylic amino acid and the hydroxy variant thereof, generally, predominantly, the gluconate.

It is apparent from the experimental work that copper solution occurs, but that it is related to the amount of air which seems to contact the solution and the copper contacted by the solution. That is there are the variables of the chemical composition to dissolve copper, but also the matter of oxidizing copper from the 0 valence state to the +2 state and oxidizing the iron from the ferrous state to the ferric state. Some tests, wherein no copper solution action showed after two and one half days, suggest that insufficient oxygen was absorbed for effective operation. Actually the liquid - air interface provides area for solubilizing the copper metal, after initial contact of the solution with oxygen. This is significant in the application of the process to dissolving copper out of mines while in contact with the ground. That is, doing so merely by spraying the copper in place with the carbonate solution containing the iron chelate, and allowing a natural reaction to take place. Where scrap recovery is concerned, similarly, a relatively static process can be practiced wherein a large volume of scrap copper is merely immersed in the solution of this kind, air is bubbled into the solution and conditions are maintained adequate to dissolve copper. The actual copper recovery is obtained by occasionally bleeding out copper solution for recovery.

III - Example

As a specific example of an industrial application for the recovery of copper, a vat, preferably porcelain lined, is filled with scrap copper. A vat of approximately hundred gallon size is a suitable one for the purpose and scrap copper to the extent of about half its physical volume is an adequate loading. However, it should be noted there is no quantitative relation between the copper and solution other than there should be more copper on hand for submersion in the solution, or wetting by it, than can be dissolved in the solution. In this way continuous solution can be had to the point of actual exhaustion of the capacity of the ammonium carbonate solution to take up copper. Hence, a vat full of copper scrap can be used.

Ammonium carbonate solution at a concentration of 100 grams of solids per liter of solution, that is 100 grams of ammonium carbonate per liter of solution is used to percolate through the copper. To this is added the iron chelate composition employing the chelating agent describe as solution B, chelating a 1:1 weight ratio of iron sulfate by reaction of ferrous sulfate with heptagluconate, ethylenediaminetetraacetic acid and hydroxyethylethylenediaminetriacetic acid. This material can be added to the extent of 2 grams of the dry powder per liter of solution. Thus, the total solution will have a total content of 102 grams per liter of solids. Very shortly, after wetting of the copper in this solution the development of a greenish blue color will be observed which color becomes gradually more intense. The rate at which the intensity of blue or blue-green color develops is porportional to the aeration of the solution so that it passes up through the mass providing contact with the ferrous chelate to oxidize it to ferric form, which form in turn reacts with the copper to bring it into solution.

Percolation of the solution over the copper mass is a suitable procedure also.

Where part of the source of copper is brass or brass cuttings, the copper and zinc are dissolved out of the brass. The resulting solution can be subjected to auxiliary recovery processes for the zinc. Similarly, since the ammonium carbonate reaction for the formation of the cupric amine is quite specific to copper, the solution of copper from scrap sources, or ores, by this method is quite selective and the copper can be recovered.

Based on experimental observation, within 24 hours, the concentration of copper in the ammonium carbonate solution should be in the range of at least 30–50 grams per liter, and if it is desired to continue the extraction to the point of saturation, the achievement of 80–100 grams per liter of copper can be had, but at the expense of continuing the process for additional time; or by using a more concentrated ammonium carbonate solution.

It is feasible after about 24 hours, to commence to bleed off part of the copper by removing some of the solution and passing it to recovery operations and replacing that portion of the solution with fresh ammonium carbonate solution. Should it be desired, all of the aqueous solution may be used for the extraction of copper and can be drained off, passed to recovery and fresh ammonium carbonate added to the vat for the recovery operation.

IV - Example

For operation in a mine, the method is exactly similar, except that confinement of the copper and solution to a convenient sized vat is not feasible.

We have found that raw copper ore, native copper, when wetted with a solution containing 75 grams of ammonium carbonate per liter and our iron chelate, to the extent of 2 grams of solids per liter, and allowed to dry, forms soluble amounts of copper at the surfaces thus wetted by the ammonium carbonate solution. Thereafter, removal of the copper ammonium carbonate from the surface of the thus exposed native copper can be achieved by leaching the copper ore with water. Generally, for operations in a mine, wherein the surfaces of the vein or native copper will be wetted with the solution, it is preferable to operate with relatively higher concentrations of ammonium carbonate because the effective contact and the aeration is only for the period in which the surface is wet with the solution and in the process of drying. Once the drying has occurred reaction ceases and then it is a matter of recovery.

Accordingly, for operation within a mine, it is desirable to improvise the equivalent of the vat which we have described in connection with industrial operations, enclosing within a plastic tarpaulin. (sheets of polyethylene or polyvinyl chloride are adequate) an appropriate amount of copper ore or native copper, soaking it with an amount of ammonium carbonate solution which is suitable to be handled, and leaving it for a period of a day to a week in contact with air to become saturated by natural solution and natural oxidation. Once a state of equilibrium has been reached, in which the concentration will be of the order of 20–30 grams of copper per liter, solution can be pumped out and recovered and the wet process of extraction repeated.

The tests indicate that the solution of copper is dependent upon oxidation or access of air to the wetted copper surface and that with a certain amount of the iron chelate in the solution together with access to air, the copper concentration in the solution is readily raised to a level of 37.5 grams of copper per liter.

It should be understood that the colorimetric analyses are subject to certain experimental error which can be as much as 5%, but where the measurement here reported show that the increase in concentration is of a magnitude of 200% to 300% beyond the untreated ammonium carbonate solution, it is evident that the phenomenon is significantly outside the experimental error range.

The tests indicate that in ammonium carbonate solution, the iron chelate of gluconic acid alone is an improvement over no iron chelate as such and better than the ferric heptagluconate.

The iron chelate of ethylenediaminetetraacetic acid above induces precipitation, but the precipitate does not prevent solution of metallic copper as did the ferric heptagluconate.

It is apparent that in the balancing of variables, the individual components of the iron chelate which we have found useful will have varying effects, but that in combination the valuable overall synergistic effect is obtained.

Indications are that in our process about 75 grams of copper per liter of solution can be developed, which is approximately 7½ times the conventional expected 10 grams per liter obtainable by ordinary static leaching of copper with ammonium carbonate. That is the improvement is in the length of time taken to obtain a reasonable concentration and it also in the extent of the concentration which is obtained, both in the time and concentration.

The overall improvement of the process of copper extraction is also obtained by the addition of the iron chelate wherein the concentration can be moved up to 120 grams or more copper per liter in the length of time or lesser length of time used in conventional static operation. The individually tested iron chelates did not give significantly better results than the combinations we have described. From this, it is apparent that the iron chelate of the combination described herein, that is the dried product probably has a special effect on the process not evident in the chelates developed in the wet way.

INDUSTRIAL LARGE-SCALE APPLICATION OF THE PROCESS

In view of the fact that copper scrap is generally available in relatively large quantity and copper as a metal when used industrially is quite pure, recovery of the copper from various forms of scrap is useful. It is in this area, where the process has its most direct application.

For many situations the scrap copper is recovered by direct melting and thermal refining. Of course here, there is no application for our process.

It is those situations where copper occurs in combination with other metals or in admixture with plastic materials and the like, where it is desirable to have some means of selectively removing the copper that this process has its greatest application. Its virtue also is, that there is no critical relationship between the amount of copper to be extracted and the solution itself. The capacity of the process is determined by the volume of solution being used in the particular situation and the efficiency with which copper is brought into that solution to a reasonable level of concentration, following which it can be recovered. That is, the essential purpose of our process is to bring copper into solution in the ammonium carbonate reactant solution to a level of concentration which will be useful for subsequent recovery. Generally any level of concentration of copper in aqueous solution exceeding 15 to 20 grams per liter of copper is susceptible of recovery.

Since the recovery is directed to reclaiming copper from scrap sources, the rate of the solution of the copper need not be rapid to be useful. That is, the process can be envisioned as much like operation in a mine. A vat containing the aqueous ammonium carbonate an iron chelate according to this invention, is maintained into which the scrap copper is placed. A moderate level of aeration of the vat, again, it need be only a mild rate of aeration with no great regard for rate of recovery, is maintained and it will be observed that copper passes into solution. In view of the fact that our results indicate that with time concentrations of copper approaching 80 and 100 grams of copper per liter can be achieved, it is possible virtually at any stage of the process after some solution and recover the copper therefrom in conventional manner.

Conventional copper recovery from the solution contemplates solvent raffinate extraction, with subsequent reversal with sulphuric acid solution to copper sulfate and electrolysis to copper metal. The solution which is the by-product of this operation is recycled to the leaching.

In the drawing which illustrates the operation, diagramatically with block diagrams, 10 represents the copper source, which can be a mine vein or a vat containing scrap copper. In the event it is a mine vein it is desirable to provide some means around the copper to retain the solution in contact with it, and not lose too large amount in the porous formations. Generally, plastic tarpaulins are useful for the purpose.

Removal of copper solution by line 11 to pass it to copper recovery at stage 12 is indicated. Where recovery is by leaching, leaching agent is added by line 13 and copper solution removed through line 14 while the mother liquor, from which the copper has been removed, is returned to extraction by line 15. Make-up solution is added by line 16. Cover 17 is provided for the vat. Within the vat, sprays 18 help distribute solution over the mass and perforated plate 19 in the bottom allows for drainage. Blower 20 aerates the mass being extracted.

THE SIGNIFICANCE, SCOPE AND ADVANTAGES OF THE INVENTION

Based upon this accelerated method of inducing solution of copper from its native state or its metallic state, where this becomes necessary, namely, to solubilize it from valence 0, it is possible to extract copper by this wet method from mine shafts. As a first step ammonium carbonate solution together with iron chelate made in accordance with this invention is sprayed into the dry mine shaft to cover the surface of the native copper or ore. Thereafter, ammonia and air are pumped into the shaft and, after a lapse of time, for example, a week, the shaft, or the ore, is washed with fresh ammonia-carbonate solution and the solution now containing cupric amine carbonate is pumped from the mine. The blue copper solution, which by this time will contain from about 10 to 50 grams of copper per liter, is then fed to extraction operations of a generally conventional form.

We claim:

1. The method of extracting copper metal from natural sources carrying elemental copper or from copper scrap which comprises the steps of
   1. contacting the copper-bearing material with a solution in water of
      a. ammonium carbonate in concentration range 10–50 with ammonia in range up to saturation, and
      b. 1 – 25 per cent of a water soluble iron compound comprising iron chelated with a mixture of from 50 to 90 parts of an aliphatic polyhydroxy monocarboxylic acid,
      c. from 5 to 25 parts of a hydroxy-alklamine polycarboxylate and
      d. from 5 to 25 parts of a polyamine polycarboxylate in which all amine hydrogens have been replaced by carboxyl-containing aliphatic radicals which retains in solution both ferrous and ferric form in the ammonia plus ammonium carbonate solution, said ammonium carbonate solution being held at a pH in excess of about 7,
   2. while maintaining said copper-bearing material in contact with the aqueous solution of ammonium carbonate and iron chelate,
   3. contacting said solution with air, or oxygen, to induce aeration of the copper solution interface
   4. returning any drain-off of said solution containing chelating agent and ammonium carbonate together with solubilized copper from said copper-bearing material for further extraction and solution of copper in the ammoniated ammonium carbonate solution,
   5. thereby to develop a solution of copper approaching saturation as a limit,
   6. and ultimately passing the copper in solution to a copper recovery stage.

2. The method in accordance with claim 1, comprising spraying said copper-bearing material intermittently with said aqueous solution and simultaneously aerating the wetted material.

3. The method in accordance with claim 1, wherein the chelating agent solubilizing the iron is a mixture of alkali metal salts of a monocarboxylic acid of a polyhydric alcohol, a polycarboxylic acid amine, and a polycarboxylic acid amine carrying a hydroxy-alkyl group in place of a carboxylic acid group.

4. The method in accordance with claim 1, in which the ammonium carbonate solution carries 1 percent to 5 percent of the iron chelate.

5. The method in accordance with claim 4, wherein the chelating agent which solubilizes the iron is made up of a mutually coordinated mixture of sodium salts of glucoheptonic acid, ethylenediaminetetraacetic acid and hydroxyethylenediaminetriacetic acid.

6. The method in accordance with claim 4, wherein the agent which solubilizes the iron is a mixture of the sodium salts of glucoheptonic acid, ethylene diamine tetraacetic acid and ethanol diglycine.

7. The method in accordance with claim 4, wherein the iron solubilizing agent is made up of a chelating coordinated mixture of the sodium salts of glucoheptonic acid, nitrilo triacetic acid and ethanol diglycine.

8. The method in accordance with claim 4, wherein the iron solubilizing agent is made up of chelating coordinated mixture of the sodium salts of gluconic acid, ethylene diamine tetra-acetic acid and ethanol diglycine.

9. The method in accordance with claim 4, wherein the iron solubilizing agent is made up of a chelating coordinated mixture of the sodium salts of gluconic acid, nitrilo triacetic acid and ethanol diglycine.

10. The method in accordance with claim 4, wherein the iron solubilizing agent is made up of chelating coordinated mixture of the ammonium salts of glucoheptonic acid, nitrilo tri-acetic acid and ethanol diglycine.

11. The method in accordance with claim 4, wherein the iron chelate is a water soluble dry solid prepared by wet mixing iron sulfate with a 30 percent to 60 percent solution of the sodium salts of the mixture of chelating agents, and subsequently drying the iron compound — sodium sulfacte mixture to a powder, or flake, or granular solid.

* * * * *